Patented Apr. 15, 1952

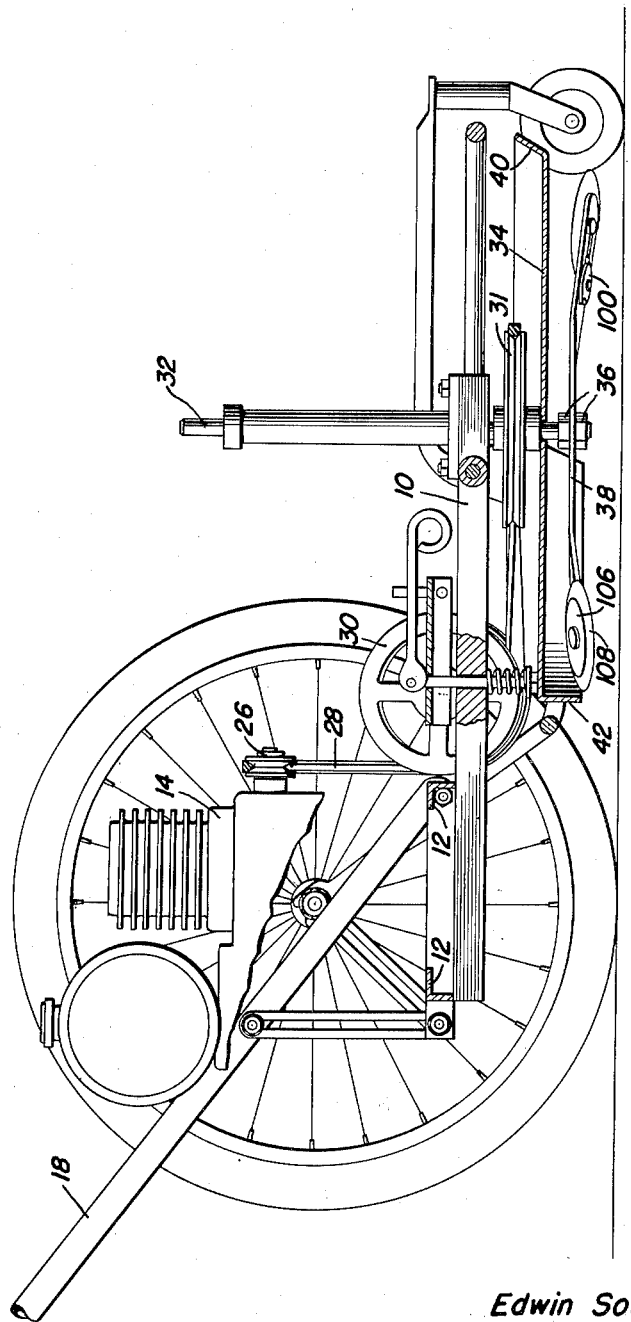

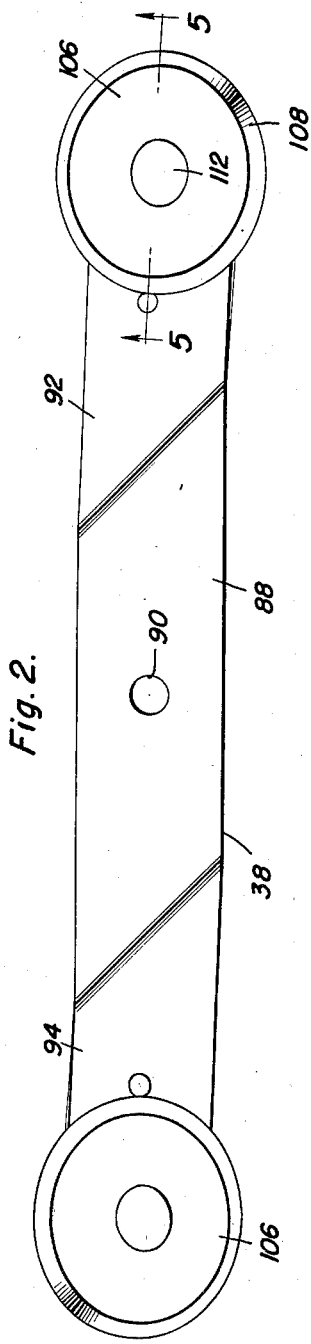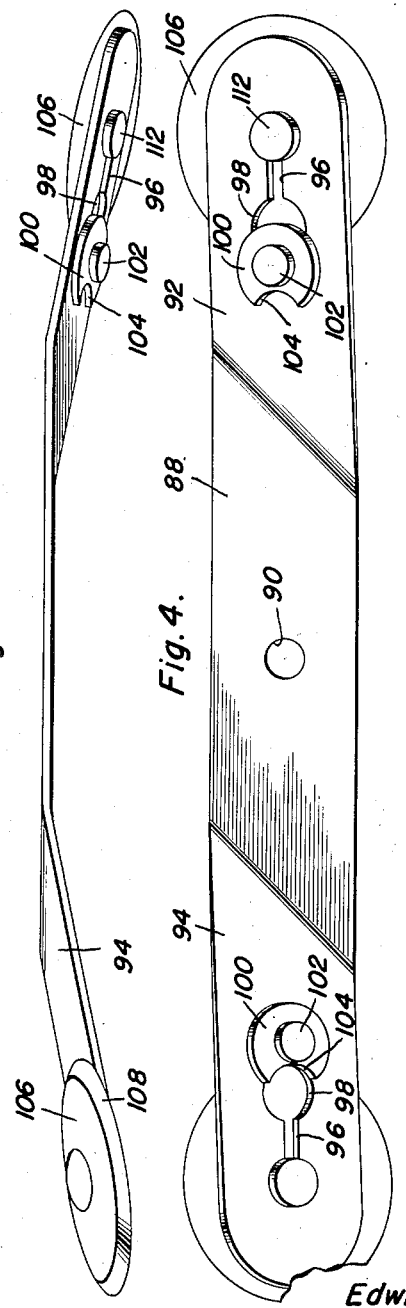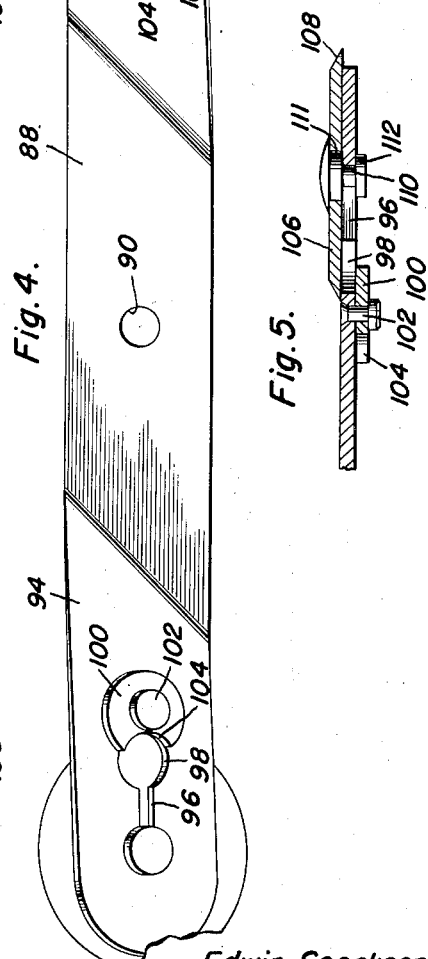

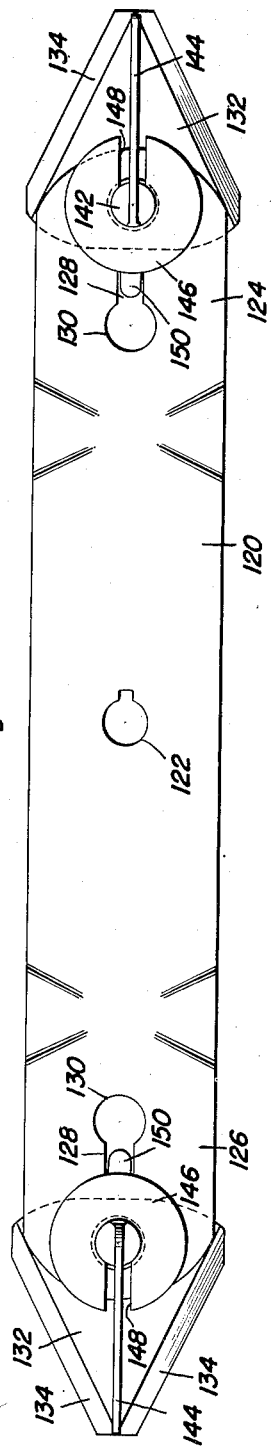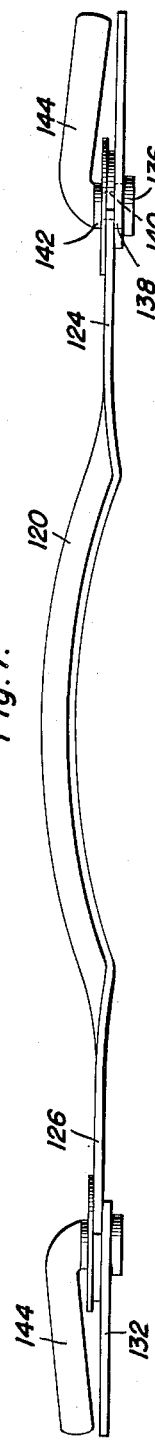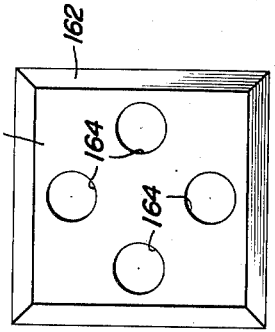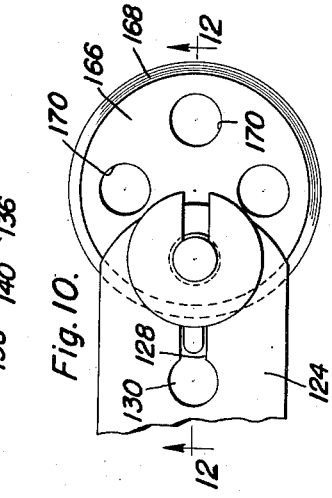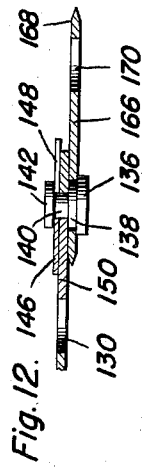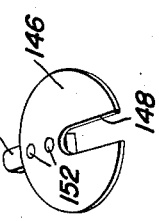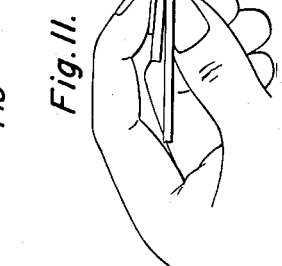

2,592,755

UNITED STATES PATENT OFFICE 2,592,755

ROTATING CUTTER BAR

Edwin Soenksen, De Witt, Iowa

Application July 28, 1949, Serial No. 107,183

12 Claims. (Cl. 56—295)

This invention comprises novel and useful improvements in a rotating cutter bar of my prior copending application, Serial No. 784,359, filed November 6, 1947, for Attachment for Grass and Weed Cutter, which has now matured into Patent No. 2,489,730.

The primary purpose of this invention is to provide an improved cutter blade having removable and replaceable cutting knives thereon together with an improved means for locking the knives in their mounting upon the cutter blade.

A further object of the invention is to provide an improved cutter blade in accordance with the foregoing object wherein the cutting knives are pivotally mounted upon the cutting blade in a yieldable manner to avoid damaging the knives and blades when the knives encounter an obstacle, such as a stone or the like.

A still further object of the invention is to provide an improved cutter blade in conformity with the foregoing objects and having means for preventing the rotating cutter blade from forming windrows during its operation.

A still further object of the invention is to provide an improved cutting blade in accordance with the preceding object, wherein the means for preventing the formation of windrows also constitutes means for locking the removable cutting knives upon the blade.

These, together with various ancillary features and objects of the invention which will later become apparent as the following description proceeds, are attained by the present device, preferred embodiments of which have been illustrated by way of example only in the accompanying drawings, wherein:

Figure 1 is a vertical longitudinal sectional view of a mower in accordance with my above identified copending application, showing details of construction and the manner of applying the improved cutter bar forming the subject of this invention thereto;

Figure 2 is a top plan view upon a somewhat enlarged scale of the improved cutter blade in accordance with one embodiment of this invention;

Figure 3 is a side elevational view of Figure 2;

Figure 4 is a bottom plan view of the cutter blade of Figure 2;

Figure 5 is an enlarged detail view taken in vertical longitudinal section substantially upon the plane of the section line 5—5 of Figure 2;

Figure 6 is a top plan view showing a second embodiment of the invention;

Figure 7 is a side elevational view of the embodiment of Figure 6;

Figure 8 is a perspective view of a locking member in accordance with a further embodiment of the invention;

Figure 9 is a modified construction of cutter knife;

Figure 10 is a fragmentary top plan view of a portion of a cutter bar and a still further embodiment of cutter knife applied thereto and retained by the locking means of Figure 8;

Figure 11 is a side elevational view illustrating the manner of applying and removing the locking means of Figure 8 from the construction of Figure 10; and Figure 12 is a vertical longitudinal sectional view taken substantially upon the plane of section line 12—12 of Figure 10.

In the accompanying drawings, like numerals designate similar parts throughout the various views and Figure 1 discloses a suitable embodiment of mower with which the cutter bar forming the subject of this invention may be employed, this mower being preferably of the construction disclosed in my above copending application, the embodiment of cutter bar illustrated in Figures 2–5 having been disclosed in and having been divided out of my above identified copending application.

Referring first to Figure 1, it will be seen that the numeral 10 designates a portion of the frame of the device which, as shown, comprises an elongated member having transverse supporting bars 12 constituting a platform upon which is suitably mounted a power source such as an internal combustion engine indicated generally at 14. A pair of handle members, one of which is indicated at 18, provides a means whereby the mower may be moved and guided as desired.

The motor is provided with a power take-off or driving pulley 26, a belt drive comprising an endless belt 28 which extends about a pair of idler pulleys 30, one of which is shown in Figure 1, this belt then extending about a driven pulley 31 suitably mounted upon a vertically disposed driven shaft 32 journalled in any desired manner in the frame member 10.

Below the frame member 10, the driven shaft 32 is provided with the above-mentioned driven pulley, and then extends downwardly through a circular shield 34, and terminates at its lower extremity in a screw-threaded portion having adjusting nuts 36 by means of which a cutter blade or bar 38 is retained upon the driven shaft 32 in a vertically adjusted position.

At its forward end, the annular shield 34 is upturned, as at 40, to provide a deflecting baffle for directing grass or other material into the path of travel of the horizontally rotating cutter bar 38, while the rear end of the shield 34 is downwardly turned to provide an arcuate rim 42 at the rear of the cutter blade for preventing material cut by the blade or object struck thereby from being thrown backward against the operator or into the machinery of the mower.

It will thus be seen that upon operation of the power source 14, the cutter bar 38 will be rotated about the vertical axis of rotation of the shaft 32, within the confines of the shield 34. The actual structural details of the mower frame, in themselves, form no part of the invention as claimed in this application, and reference is made to my copending application for the detailed construction of the same.

Attention is now directed more specifically to Figures 2-5 for a better understanding of the construction of the cutter blade, embodying the principle of this invention. The blade consists of a bar or strip of material having a central portion 88 provided with an axial bore 90 by means of which the cutter blade is secured upon the driven shaft 32. Extending from opposite sides of the central portion 88 are angularly bent end portions 92 and 94 of the blade, these portions being both bent downwardly in the same general direction but twisted or inclined relative to each other in opposite directions about the central line of the blade. By means of this bend in construction, the cutter elements upon the end of the blade, and to be now described, are given a greater clearance with the overlying shield portion of the device.

As shown best in Figure 4, the bent portions 92 and 94 are provided adjacent their ends with elongated slots 96 which may be disposed upon the longitudinal axis of the blade or may be inclined thereto as desired, but, in any event, extend in a direction which is generally lengthwise of the blade. The slots 96 at their inner extremities are provided with enlarged portions 98. An annular disk 100 constituting a closure member is journaled, as at 102, upon the lower surfaces of the bent portions in a position to have its circumference overlie a portion of the enlarged portion 98, but having a notched portion 104 formed in the circumference which is registrable with the enlarged portion to provide an unobstructed passage therethrough. The two closing and opening positions of the closure member are illustrated at the right and left-hand ends of Figure 4.

The device further includes a detachable cutter knife for each end of the cutter blade, this knife comprising a plate member 106 which may be of various suitable shapes as set forth hereinafter, and may conveniently, as shown in Figures 2-5, consist of a disk having a peripherally beveled cutting edge 108, see Figure 2, and further having a perpendicularly disposed shank or pin 110 extending therefrom and terminating in an enlarged headed end 112, spaced from a shoulder 111 of the pin. The size of the shank 110 and of the headed end 112 are such that the shank may be received within and readily slidable in the slot 96; but the headed end 112 may not pass through the slot but is receivable and removable through the enlarged portion 98, whereby the same may be introduced therethrough and the shank seated in the slot. When so positioned, this closure member 100 may be rotated to present its unnotched portion over the enlarged portion 98, to thereby prevent withdrawal of the rotary knives through the opening 98.

It should be here noted that the center of gravity of the closure member 100 is preferably on the opposite side of the axis 102 from the notch 104, whereby during operation of the device and rotation of the cutter blade 88, centrifugal force will urge the solid portion or center of gravity portion of the closure 100 into a position to obstruct the opening 98 as shown at the right-hand side of Figure 4. Moreover, during this operation, centrifugal force will urge the knife 106 outwardly of the blade 88, and will urge the shank 110 to the outermost end of the slot 96. To remove the cutter knife, it is therefore necessary to manually rotate the closure member to the position shown at the left-hand side of Figure 4, in order that the headed end of the shank 110 of the rotary cutter knife may be aligned with and withdrawn through the opening 98. The foregoing construction thus prevents accidental detachment of the cutter knife from the blade during operation of the mower.

Reference is now made to the further modified constructions of cutter and cutter blade illustrated in Figures 6-12 and which constitute an improvement over the construction of Figures 2-5 which formed a part of and were disclosed in my co-pending application above identified.

Considering first the embodiment of Figures 6 and 7, as in the preceding embodiment, the cutter blade includes an elongated flat metal strap or bar having its central portion 120 which is axially apertured, as at 122, for attachment to a driving shaft for rotation about a vertical axis as in the preceding embodiment. The central portion 120 has flat end portions 124 and 126 extending therefrom, these end portions having elongated slots 128 which, while illustrated as being disposed upon the longitudinal axis of the blade, may, if desired, be inclined thereto but, in any event, will extend in a generally lengthwise direction with respect to the blade, and at their inner ends terminate in enlarged portions 130.

Detachably and pivotally secured to each of the angularly disposed flat ends 124 and 126 is a cutter knife consisting of a flat plate 132 which may conveniently be of generally triangular shape and which, upon its periphery or edges, is provided with a bevelled knife edge 134. This plate, at its widest point, is preferably slightly greater than the width of the bar 120, so that the knife edges 134 extend laterally beyond the sides of the cutter bar and beyond the ends of the same. As in the preceding embodiment, the cutter knife is provided with a perpendicularly extending axis forming a pivot pin, this axis being of substantially identical construction with that set forth in connection with the embodiment of Figures 2-5, and including a headed portion 136 having adjacent thereto a shouldered portion 138 which is received in an aperture in the knife plate 132, the head portion 136 overlying the plate. The shouldered portion 138, in turn, is provided with a diametrically reduced shank indicated in dotted lines at 140, this shank extending through and being slidably received in the slot 128, the shank in turn terminating in a headed or shouldered portion 142 from which extends a blade 144 disposed in a plane which is perpendicular to the plane of the plate 132, this blade being of sufficient length to extend substantially to the outer end of the knife, as will be apparent from Figures 6 and 7.

In the embodiment previously described, and also in the embodiment of Figures 6 and 7, it is contemplated that the pivot pin may be loosely received in the cutter knife, so that the knife has a pivoting movement upon the pin as well as a pivotal engagement with the end of the cutter blade. In addition, in the embodiment of Figures 6 and 7, the portion 144 disposed upon the opposite side of the cutter blade from the cutter knife constitutes a deflector for the grass or other material cut by the rotating cutter blade, and thus scatters the same and prevents the formation of windrows during operation of the device.

A centrifugally actuated locking means is provided for preventing unintentional and accidental disengagement of the cutter knife from the cutter blade. This locking means consists of a flat disk 146, see Figure 8, which may be conveniently of annular shape, and which is provided with a radially extending notch 148. A projection 150 is fixedly secured to the disk 146 as by rivets or the like 152 at the diametrically opposite side of the same from the notch 148, and this projecting extends both radially and laterally from the disk, as will be apparent from Figure 11. The notch 148 is adapted to be slidably received upon the shank 138 beneath the shouldered portion 142 and the opposite side of the end of the blade from the cutter knife, as shown in Figures 7, 11, and 12. There is just sufficient clearance between the shouldered portion 142 and the end of the blade 124 or 126 to receive the disk 146, with the projection 150 being received in and slidable in the slot 128, and the enlarged portion 130. When in the position indicated in the drawings, the center of gravity of the cutter knife, of the windrowing member 144, and of the locking disk 146 is such that each of these members will be urged radially outwardly from the center of rotation of the cutter blade, thereby preventing accidental disengagement of the blade and its cutter knife during operation.

It will be here noted that in the assembling of the device, the windrowing attachment 144 which is formed as an integral part of the pivot pin 138 is first inserted through the pivot aperture in the cutter knife and then through the enlarged portion 130 of the slot 128, whereupon the cutter knife will be drawn against the cutter blade or bar, with the headed portion 136 snugly engaging one surface of the cutter knife, while the other surface of the latter engages the adjacent surface of the end portion of the cutter bar, and the shouldered portion 138 is then received in the pivot aperture of the cutter knife, while the shank of the pivot pin extends through the slot 128. In this position, with the shank at the extreme outward end of the elongated slot 128, the locking member is then applied in the position shown in Figure 11, with the end of the notch now being engaged under the shoulder 142 and upon the shank 138. In this position, there is sufficient clearance to press the projection 150 down into the enlarged portion 130, whereupon the locking member may be slid radially outwardly of the slot, and complete the locking operation.

Obviously, the cutter blade may be formed of various shapes. One such shape is illustrated in Figure 9, wherein the blade is shown as being substantially rectangular or square, this blade consisting of a plate 160 having peripheral beveled edges 162 thereabout, and having a plurality of pivot apertures 164 disposed eccentric to the center of gravity of the cutter knife. This knife is pivotally secured to the cutter bar ends 124 and 126 in exactly the same manner as that set forth in connection with the triangular shaped knife 132.

A still further modification is illustrated in Figures 10 and 12, wherein the end 124 of the cutter blade having the slot 128 with the enlarged portion 130 therein is provided with a still further form of cutter knife, consisting of a plate 166 having a beveled peripheral annular cutting edge 168 thereon, and having a plurality of pivot apertures 170 therein which are eccentric with respect to the center of gravity of the knife 166. The same fastening means previously described in connection with Figures 6–11 is provided for this embodiment, and its operation is the same as previously set forth.

It should be here noted that the embodiments of Figures 9 and 10 may have the pivot pin formed with the windrowing blade 144 if this windrow preventing action is desired; while the arrangement of Figures 6 and 7 may dispense with the windrowing attachment 144, and may form the pivot pin with the headed extremity 142 if desired.

From the foregoing, the construction and operation of the device will be readily understood and further explanation is believed to be unnecessary. It will be particularly noted, however that the various embodiments of the invention each provides and each is based upon the fundamental principle of cutter knives pivotally secured to the ends of a cutter bar, in a detachable manner, and with centrifugal force actuated means for locking the cutter knives to the blades. Further, in the embodiments of Figures 6–12, the cutter knife is adapted to pivot, and thus be moved or turned inwardly of the end of the cutter blade when the knife strikes an obstacle such as a stone or the like, to thereby prevent damage to the knife or blade; while in the arrangement of Figures 2–5, the knife is free to move radially inwardly of its slot 96 and be recessed inwardly of the end of the blade for the same purpose.

Since numerous modifications will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A cutter blade for mowers comprising a cutter bar, means mounting the latter for rotation about an axis perpendicular to the bar, said bar having a flat end, a flat knife overlying and pivoted to said flat end, means detachably and pivotally securing said knife to said flat end, centrifugally actuated means for locking said pivot means to said flat end, said flat end having an elongated slot extending lengthwise of said cutter bar, said pivot means being attached to said knife and extending through said slot, said slot having an enlarged portion at its end disposed inwardly of the flat end, said pivot means being retained in said slot and slidable longitudinally thereof and being removable through said enlarged portion.

2. A cutter blade for mowers comprising a cutter bar rotatable in the horizontal plane about a vertical axis, said bar having a knife receiving portion, a knife having a cutting edge, pivot means detachably and pivotally securing said knife upon said knife receiving portion, said pivot means mounting said knife with said cutting edge normally extended beyond the side of said cutter bar during rotation of the latter and being movable within the side of the cutter bar, centrifugally actuated locking means for retaining said pivot means upon said blade receiving portion.

3. The combination of claim 2 wherein said blade is pivoted to said knife receiving portion upon an axis which is eccentric with respect to the center of gravity of said knife.

4. The combination of claim 2 wherein said cutter bar has an elongated slot extending radially from the vertical axis of rotation of the bar, said pivot means being attached to said knife and being slidable within said slot.

5. The combination of claim 4 wherein said locking means is slidably retained in said slot, said locking means having its center of gravity eccentric with respect to the axis of rotation of the pivot means.

6. A cutter blade for mowers comprising an elongated cutter bar adapted to rotate about an axis which is perpendicular to the bar and located intermediate its ends, said bar having a flat end, a flat knife resting upon and overlying said flat end, a spindle comprising a pivot carried by said knife, means for removably mounting said spindle upon said flat end, centrifugally actuated locking means preventing removal of said spindle from said flat end.

7. A cutter blade for mowers comprising an elongated cutter bar adapted to rotate about an axis which is perpendicular to the bar and located intermediate its ends, said bar having a flat end, a flat knife resting upon and overlying said flat end, a spindle comprising a pivot carried by said knife, means for removably mounting said spindle upon said flat end, centrifugally actuated locking means preventing removal of said spindle from said flat end, said means for removably mounting said spindle consisting of a slot in said flat end, said spindle being slidable in said slot and having an enlarged portion preventing removal of said spindle from said slot.

8. A cutter blade for mowers comprising an elongated cutter bar adapted to rotate about an axis which is perpendicular to the bar and located intermediate its ends, said bar having a flat end, a flat knife resting upon and overlying said flat end, a spindle comprising a pivot carried by said knife, means for removably mounting said spindle upon said flat end, centrifugally actuated locking means preventing removal of said spindle from said flat end, said means for removably mounting said spindle consisting of a slot in said flat end, said spindle being slidable in said slot and having an enlarged portion preventing removal of said spindle from said slot, means providing ingress and egress of said spindle to and from said slot.

9. A cutter blade for mowers comprising an elongated cutter bar adapted to rotate about an axis which is perpendicular to the bar and located intermediate its ends, said bar having a flat end, a flat knife resting upon and overlying said flat end, a spindle comprising a pivot carried by said knife, means for removably mounting said spindle upon said flat end, centrifugally actuated locking means preventing removal of said spindle from said flat end, said means for removably mounting said spindle consisting of a slot in said flat end, said spindle being slidable in said slot and having an enlarged portion preventing removal of said spindle from said slot, means providing ingress and egress of said spindle to and from said slot, said centrifugally actuated means blocking movement of said spindle to said last means.

10. A cutter blade for mowers comprising an elongated cutter bar adapted to rotate about an axis which is perpendicular to the bar and located intermediate its ends, said bar having a flat end, a flat knife resting upon and overlying said flat end, a spindle comprising a pivot carried by said knife, means for removably mounting said spindle upon said flat end, centrifugally actuated locking means preventing removal of said spindle from said flat end, said knife resting on one side of said flat end and said centrifugally actuated locking means resting upon the other side thereof.

11. A cutter blade for mowers comprising an elongated cutter bar adapted to rotate about an axis which is perpendicular to the bar and located intermediate its ends, said bar having a flat end, a flat knife resting upon and overlying said flat end, a spindle comprising a pivot carried by said knife, means for removably mounting said spindle upon said flat end, centrifugally actuated locking means preventing removal of said spindle from said flat end, said means for removably mounting said spindle consisting of a slot in said flat end, said spindle being slidable in said slot and having an enlarged portion preventing removal of said spindle from said slot, said centrifugally actuated locking means being slidably mounted in said slot.

12. A cutter blade for mowers comprising an elongated cutter bar adapted to rotate about an axis which is perpendicular to the bar and located intermediate its ends, said bar having a flat end, a flat knife resting upon and overlying said flat end, a spindle comprising a pivot carried by said knife, means for removably mounting said spindle upon said flat end, centrifugally actuated locking means preventing removal of said spindle from said flat end, said means for removably mounting said spindle consisting of a slot in said flat end, said spindle being slidable in said slot and having an enlarged portion preventing removal of said spindle from said slot, said centrifugally actuated locking means being slidably mounted in said slot, said knife resting on one side of said flat end and said centrifugally actuated locking means resting upon the other side thereof.

EDWIN SOENKSEN.

REFERENCES CITED

The following references are of record in the file of this patent:

UNITED STATES PATENTS

| Number | Name | Date |
|---|---|---|
| 1,831,681 | Miller | Nov. 10, 1931 |
| 1,980,900 | Bemis | Nov. 13, 1934 |
| 2,071,872 | Cockburn | Feb. 23, 1937 |
| 2,134,115 | Flammang | Oct. 25, 1938 |
| 2,137,800 | Davey | Nov. 22, 1938 |
| 2,198,526 | Cockburn | Apr. 23, 1940 |
| 2,477,442 | Cramer, Jr., et al. | July 26, 1949 |
| 2,529,797 | Cauble | Nov. 14, 1950 |

FOREIGN PATENTS

| Number | Country | Date |
|---|---|---|
| 103,525 | Australia | Mar. 21, 1938 |